(No Model.)
L. G. WOOLLEY.
AUTOMATIC STEAM PRESSURE REGULATOR.
No. 342,161. Patented May 18, 1886.
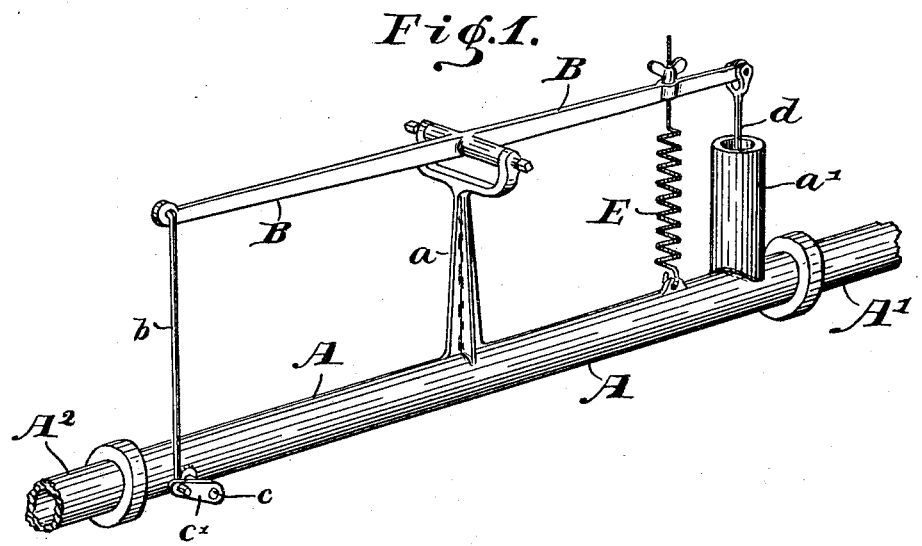
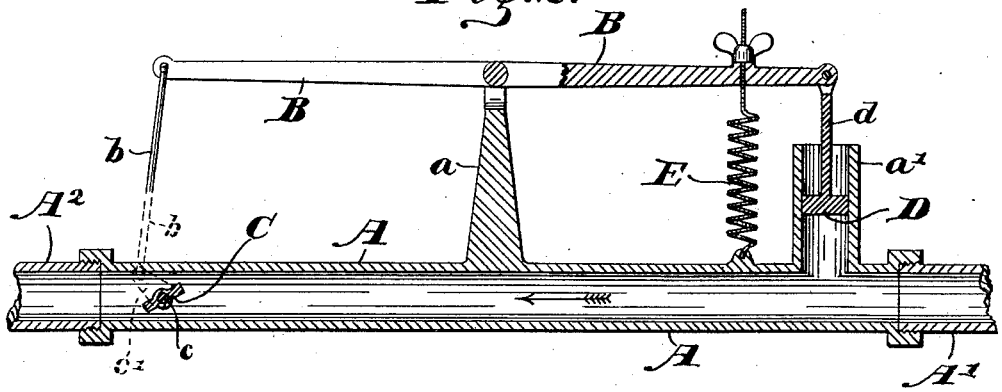
WITNESSES. INVENTOR.

UNITED STATES PATENT OFFICE.

LEONIDAS G. WOOLLEY, OF INDIANAPOLIS, INDIANA, ASSIGNOR TO HENRY H. McGAFFEY AND CHESTER BRADFORD, BOTH OF SAME PLACE.

AUTOMATIC STEAM-PRESSURE REGULATOR.

SPECIFICATION forming part of Letters Patent No. 342,161, dated May 18, 1886.

Application filed November 16, 1885. Serial No. 182,904. (No model.)

*To all whom it may concern:*

Be it known that I, LEONIDAS G. WOOLLEY, of the city of Indianapolis, county of Marion, and State of Indiana, have invented certain new and useful Improvements in Automatic Steam-Pressure Regulators, of which the following is a specification.

The object of my said invention is to produce a device which shall regulate the passage of steam through a pipe by the pressure of the steam itself, or, in other words, an automatic steam-pressure regulator. This object is accomplished by placing a pivoted valve in the pipe, the pivot or shaft of which extends outside the pipe, connecting said pivot or shaft with a piston located in a branch leading from the pipe on the side of the valve from which the steam-pressure comes, and attaching a spring which will operate reversely to the steam-pressure on said piston, as will be hereinafter more particularly described.

Referring to the accompanying drawings, which are made a part hereof, and on which similar letters of reference indicate similar parts, Figure 1 is a perspective view of a section of steam-pipe provided with my invention, and Fig. 2 is a central longitudinal section thereof.

In said drawings, the portions marked A represent the section of pipe to which my invention is applied; B, the pivoted lever; C, the valve; D, the piston, and E the spring. The section of pipe A is adapted to be coupled at each end to ordinary piping or other devices through which the steam passes. At or near its center it is provided with a stud, $a$, carrying pivots or pivot-bearings for the lever B. At or near one end is a branch, $a'$, in which the piston D operates, and at the other end it is provided with bearings for the shaft or pivot of the valve. At each end it is adapted to be coupled to the pipes $A'$ $A^2$ or other devices, as shown. The lever B is mounted, by means of pivots or bearings, on the stud $a$, and is connected at one end by a connecting link or rod, $b$, to the crank-arm of the valve, and at the other end by a similar connecting link or rod, $d$, to the piston D. The valve C is shown as of that variety known as a "butterfly-valve." It is provided with the usual pivot-shaft, $c$, on the end of which is a crank-arm, $c'$, to which the link or rod $b$ is connected. The piston D fits and operates in the branch $a'$ of the pipe A, and is connected, as before stated, by the link or rod $d$, to the lever B. The spring E is connected at one end to the pipe A, or to some other suitable point, and at the other end to the lever B, and operates through said lever and its connecting-rod reversely to the steam-pressure on the piston D.

The operation of my invention is as follows: The steam-pressure comes in the direction of the arrow through the pipe $A'$, or otherwise, from the steam-boiler into the pipe A. The spring E being properly adjusted, the pressure operates, through the piston, the lever, and the connecting-rods, to hold the valve C to just that inclination which will permit the desired amount of steam to pass to produce the required effect. If the steam-pressure increases, the valve C will be closed proportionately, as will be readily understood, and as it decreases it will be opened in like manner. The spring E can be adjusted to any resistance desired, so as to produce exactly the proper result.

This invention is particularly useful in connection with incandescent locomotive electric head-lights, and is applied to the pipe leading from the locomotive-boiler to the engine which drives the dynamo. By its use, no matter what the steam-pressure in the boiler, an equal and steady pressure is maintained on the engine and the dynamo, and thus an equal and unvarying current is produced, which is very desirable in lights of this character.

Of course the invention can be applied to other uses; but this is one in which it is particularly valuable.

Having thus fully described my said invention, what I claim as new, and desire to secure by Letters Patent, is—

1. The combination, with a steam-pipe, of a butterfly-valve pivoted at its center therein, a branch having a piston therein, a pivoted lever connected to said piston and said valve, and a spring or equivalent device arranged to operate on said lever reversely to the pressure of the steam on said piston, whereby the steam-pressure is automatically regulated, substantially as set forth.

2. The combination of the steam-pipe A, having a branch, $a'$, a piston located and operating in said branch, a valve, C, pivoted at its center in said pipe A, a lever pivoted in suitable bearings between said branch and said valve, one end of which is connected to each, and a spring arranged to operate reversely to the steam-pressure upon said pivoted lever, whereby said steam-pressure is automatically regulated, substantially as set forth.

3. The combination, in a steam-pressure regulator, of the steam-pipe A, a valve therein, a branch in said steam-pipe between said valve and the steam-boiler, a lever connected at one end to an arm on the valve-pivot, and at the other end to the piston in the branch, and a spring or equivalent device operating reversely to the steam-pressure on said piston.

4. The combination of the pipe A, branch $a'$, stud $a$, pivoted lever B, valve C, having pivot-shaft $c$, crank-arm $c'$, links $b$ and $d$, piston D, and spring E, substantially as set forth.

In witness whereof I have hereunto set my hand and seal at Indianapolis, Indiana, this 30th day of October, A. D. 1885.

LEONIDAS G. WOOLLEY. [L. s.]

In presence of—
  C. BRADFORD,
  CHARLES L. THURBER.